UNITED STATES PATENT OFFICE.

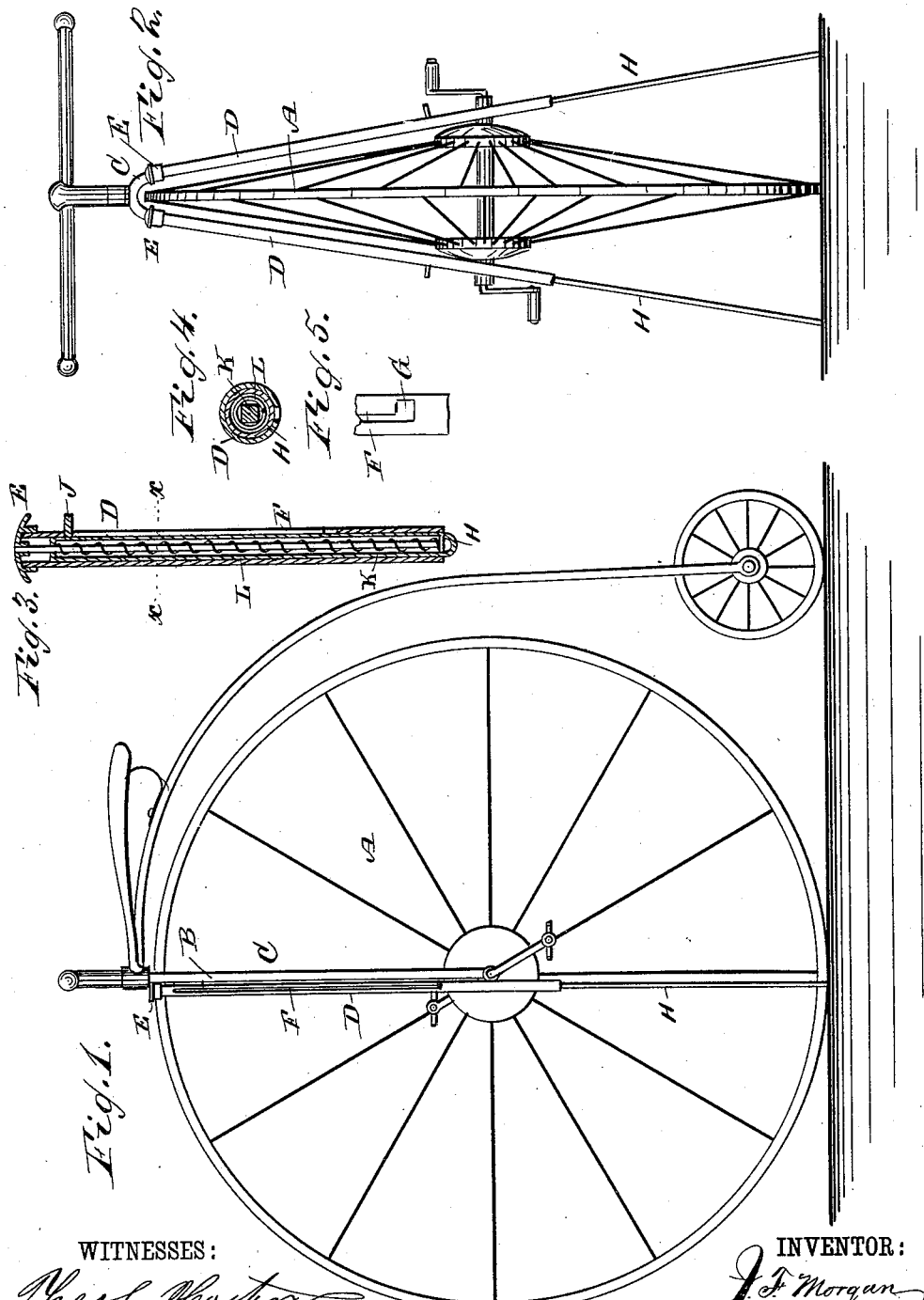

JOHN F. MORGAN, OF LYNN, MASSACHUSETTS.

BICYCLE-LEG.

SPECIFICATION forming part of Letters Patent No. 335,297, dated February 2, 1886.

Application filed August 6, 1885. Serial No. 173,736. (Model.)

*To all whom it may concern:*

Be it known that I, JOHN F. MORGAN, of Lynn, in the county of Essex and State of Massachusetts, have invented a new and Improved Bicycle-Leg, of which the following is a full, clear, and exact description.

The object of my invention is to provide a new and improved leg or standing-rest for bicycles for the purpose of holding the bicycle erect when the same is at a standstill.

The invention consists in the construction and arrangement of parts, as will be hereinafter fully described and claimed.

Reference is to be had to the accompanying drawings, forming a part of this specification, in which similar letters of reference indicate corresponding parts in all the figures.

Figure 1 is a side view of a bicycle provided with my improved bicycle-leg, the same being extended. Fig. 2 is a front view of the same. Fig. 3 is a longitudinal sectional view of the leg and its casing. Fig. 4 is a sectional plan view of the same on the line $x\,x$, Fig. 3. Fig. 5 is a detail side view of part of the casing.

The bicycle A is of the usual construction, and on each shank B of the fork C a tubular casing, D, is secured, which is closed at the top by a loose cap, E. Each casing is provided in the outer side part with a longitudinal slot, F, having a notch, G, at its lower end, the said notch extending toward the rear. A sliding tubular leg-extension, H, is contained in the casing D, and is provided with a lug, J, projecting through the slot F. A squared rod, K, projects from the cap E down through the center of the casing and through a square aperture in the top end of the tubular extension or leg H. The said rod is surrounded by a spiral spring, L, resting against the under side of the top piece of the extension or leg H and against a bottom cross-piece on the rod. Usually the springs L keep the tubular extensions or legs H raised within the casings D.

When the vehicle is to be supported and held while at a standstill, the legs H are forced down by pressing down the lugs J, and when the said lugs are at the lower ends of the slots F the lugs are turned or swung toward the rear to pass into the notches G, thus locking the legs in place. As the legs rest on the ground, they prevent the bicycle from falling over, and the rider can mount very easily. Before starting the bicycle he pushes the lugs J out of the notches G by turning the caps E at the top of the casings, and the springs L draw the legs or tubular extensions H into the casings D.

Having thus described my invention, what I claim as new, and desire to secure by Letters Patent, is—

1. The combination, with a bicycle, of tubular casings on the shanks of the fork, which casings have longitudinal slots with notches at the ends, sliding legs in the casings, and lugs projecting from the legs through the slots in the casing, substantially as herein shown and described.

2. The combination, with a bicycle, of a tubular casing on each shank of the fork, a squared rod held in and extending through each casing, a spring surrounding the rod, and a tubular leg sliding in the casing and on the said rod, substantially as herein shown and described.

3. The combination, with a bicycle, of the casings D on the fork, the caps E, the squared rods K, held to the same and passed through the casings D, the tubular leg H, sliding in the casings, and the springs L, substantially as herein shown and described.

JOHN F. MORGAN.

Witnesses:
F. MAY LULL,
EDWIN J. MEDBERY.